(12) United States Patent
Edwards et al.

(10) Patent No.: US 8,427,433 B2
(45) Date of Patent: *Apr. 23, 2013

(54) TACTILE-FEEDBACK TOUCH SCREEN

(75) Inventors: Lewin Edwards, Forest Hills, NY (US); Patricia McCrimmon, Mineola, NY (US); Richard Thomas Watson, South Hempstead, NY (US)

(73) Assignee: Honeywell International Inc., Morristown, NJ (US)

( * ) Notice: Subject to any disclaimer, the term of this patent is extended or adjusted under 35 U.S.C. 154(b) by 775 days.

This patent is subject to a terminal disclaimer.

(21) Appl. No.: 12/253,605

(22) Filed: Oct. 17, 2008

(65) Prior Publication Data
US 2010/0182245 A1    Jul. 22, 2010

(51) Int. Cl.
G06F 3/041    (2006.01)
(52) U.S. Cl.
USPC .......................................................... 345/173
(58) Field of Classification Search .................... 345/173
See application file for complete search history.

(56) References Cited

U.S. PATENT DOCUMENTS

| | | | |
|---|---|---|---|
| 7,226,291 B2 * | 6/2007 | Spedden | 434/114 |
| 2005/0024342 A1 | 2/2005 | Young | |
| 2007/0222765 A1 | 9/2007 | Nyyssonen | |
| 2008/0010593 A1 * | 1/2008 | Uusitalo et al. | 715/702 |
| 2008/0303782 A1 * | 12/2008 | Grant et al. | 345/156 |

OTHER PUBLICATIONS

Brock, et al., "A Dynamic Model of a Linear Actuator based on Polymer Hydrogel", 1-18, http://www.ai.mit.edu/projects/muscle/papers/icim94/paper.html.

* cited by examiner

*Primary Examiner* — Amare Mengistu
*Assistant Examiner* — Shawna Stepp Jones
(74) *Attorney, Agent, or Firm* — Husch Blackwell

(57) ABSTRACT

A system and method for providing tactile feedback on a touch screen display unit is provided. The tactile feedback unit has a gel layer for deforming discrete surface areas of a touch-screen display; and a tactile feedback controller for controlling the deformation by the gel layer. The tactile feedback unit is overlaid onto a liquid crystal display, OLED display, or other types of touch screen displays. Areas of the gel layer are individually controllable by the tactile feedback controller, such that areas of the gel layer that overlay control elements of a graphical user interface displayed on the touch screen display are activated. Additionally, contact with the touch screen display by a user at an area defined as a control element causes the corresponding area of the gel layer to provide a tactile feedback, such as deformation, vibration, etc.

17 Claims, 6 Drawing Sheets

TACTILE-FEEDBACK TOUCH SCREEN

I. CROSS REFERENCE

The present invention is related to co-pending application entitled "Polymer Hydrogel-based Tactile-Feedback Touch Screen" and having the inventors of the present invention in common.

II. FIELD OF THE INVENTION

The present invention relates generally to touch screen displays, and more specifically, the present invention relates to a system and method for providing tactile feedback on a touch screen.

III. BACKGROUND OF THE DISCLOSURE

Often times people unfamiliar with computers become intimidated with input devices such as mice and trackpads. Recent innovations such as the Apple iPhone have increased public awareness of, and desire for, touch-screen-controlled applications. Touch-screen interfaces provide the user with a more intuitive way of controlling a computer or electronic appliance.

Moreover, a touch-screen allows programmers to provide customized interfaces, which may be more appropriate for particular applications. Such as slider elements, buttons, dials and keyboards with keycaps tailored to particular languages and input requirements without requiring additional hardware. Reducing the hardware interface devices that must be provided allows manufacturers to reduce cost and increase portability of electronic devices However, a significant disadvantage of touch-screen implemented interfaces is the lack of positive tactile feedback. For example, it is impossible to operate a "soft" keyboard while doing something else (such as flying an aircraft), because there is no way to feel where the keys are positioned. Similarly, it can be difficult for visually impaired people to operate such devices, as there is no means of providing Braille identification on the keycaps or other interface elements.

One attempt at solving the problem of identifying the position of an interface element, such as a button or dial, displayed on a touch screen display is disclosed in U.S. patent application Ser. No. 11/388,224 in which a flip cover is provided with one or more cutouts positioned to expose only the interface elements to a user's touch. In this way a user's finger is essentially guided to an interface element; and in the case of a dial or slider, the user's finger is guided along the path of the interface element, However, the disclosed lid is limited to being utilized for only one particular arrangement of interface elements. Consequently, the touch screen display would not be capable of providing dynamic placement of interface elements based on the requirements of different applications being executed or functions being performed.

Moreover, rapid typing can be difficult on a touch-screen keyboard since the typist does not receive any feedback when a key is pressed on the screen. Thus, the typist must constantly review the typed information to ensure that the device has correctly registered key-presses.

Consequently, a need exists for providing tactile feedback to the user of a touch-screen device.

IV. SUMMARY OF THE DISCLOSURE

An embodiment of the present invention includes a touch-screen display, having a digitizer layer for detecting a contact of a touch-screen display surface by a user; a gel layer for deforming discrete surface areas of the touch-screen display; a display layer for generating a display; and a tactile feedback controller for controlling the deformation by the gel layer. A deforming layer disposed beneath the display layer is also provided. The deforming layer has a plurality of electromagnets arranged in a grid, with each of the plurality of electromagnets being controllable by the tactile feedback controller.

Another embodiment of the present invention includes a tactile feedback unit for providing tactile feedback on a touch-screen display. The tactile feedback unit has a gel layer for deforming discrete surface areas of the touch-screen display; a tactile feedback controller for controlling the deformation by the gel layer; and a deforming layer having a plurality of electromagnets arranged in a grid. The gel layer is permeated with magnetically attractive particles, and each of the plurality of electromagnets is controllable by the tactile feedback controller to exert magnetic force on the magnetically attractive particles of the gel layer.

V. BRIEF DESCRIPTION OF THE DRAWINGS

These and other features, aspects, and advantages of the present invention will become better understood with regard to the following description, appended claims, and accompanying drawings wherein:

VI. DETAILED DESCRIPTION OF DISCLOSURE

Figure 1:
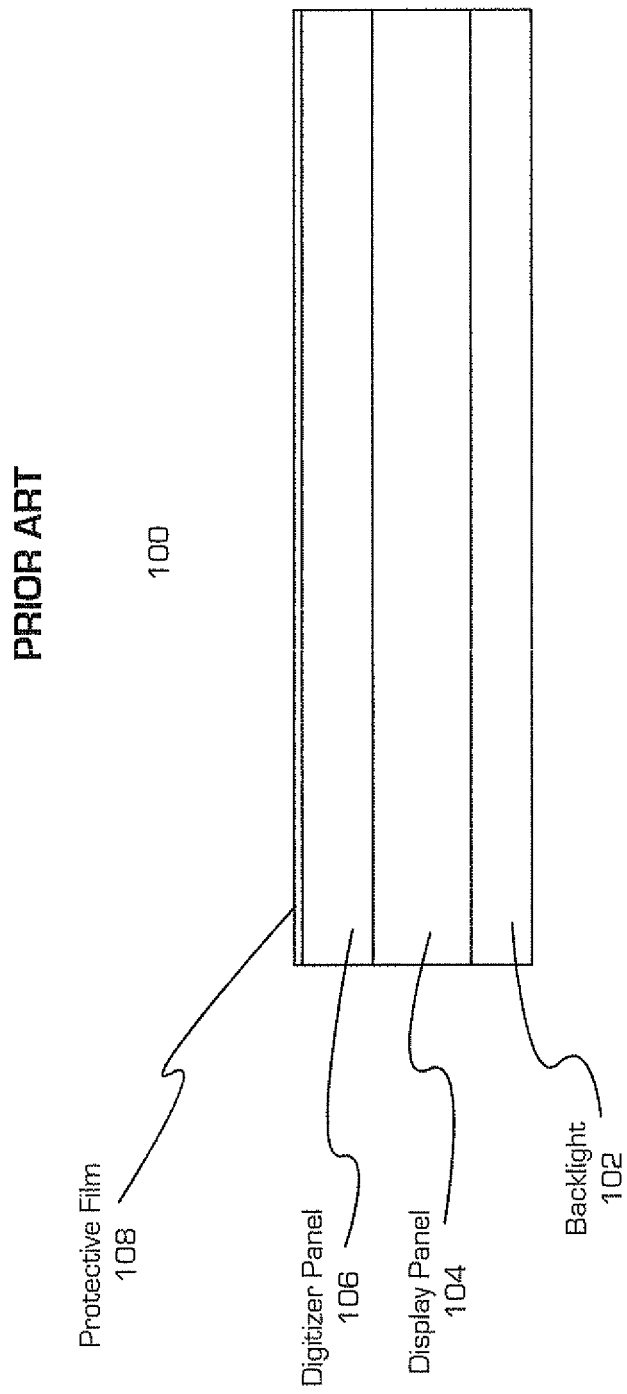
FIG. 1 illustrates a generalized cross-sectional representation of a conventional touch-screen display as known in the art.

A conventional touch-screen display 100, either LCD-based or LED-based, are constructed of several subassemblies, each of which have several component layers. The subassemblies are a backlight 102 (only used in LCD-based displays), display panel 104 and a digitizer panel 106 stacked from back to front respectively. In addition, a protective film 108 is disposed on the top surface of the conventional touch-screen display 100.

The backlight 102 provides illumination for transmissive-type LCD display panels. Alternatively, when the display panel 104 is a reflective-type LCD display panels, instead a reflector that reflects ambient light, such as sunlight or room lighting, replaces the backlight 102. In the case where the display panel 104 is an LED display, neither a reflector nor a backlight is required since the individual pixel elements of the LED display emit their own light.

As mentioned above, the display panel 104 may be either LCD-based or LED-based. An LCD display panel uses a liquid crystal layer that can be either optically transparent or opaque depending on application of an electric field through the liquid crystal layer. On the other hand, an LED display panel has a plurality of barely-visible light emitting diodes (LEDs) that emit light at a particular color when an electric current is applied.

The digitizer panel 106 provides the touch-sensitivity to the touch-screen display. Specifically, the digitizer panel 106 converts a detected contact position into an input understandable by a controller. Several methods of detecting contact, or touch, are well known in the art, including resistive, capacitive, near-field, surface acoustic wave and infrared.

A resistive digitizer is constructed of a glass panel that is covered with two conductive layers separated from each other by an insulating spacer. Touching the panel brings the two conducting layers into contact, after which the touch is detected by a change in the applied voltage. A controller analyzes the resulting change in order to calculate the contact coordinates.

In a capacitive digitizer, a conducting layer having a constant voltage applied thereto is placed on a glass panel and covered by an insulating film. When a user touches the panel, an induction current is induced in the conducting layer. Circuits located at each corner of the digitizer panel measure the change. A controller calculates, from the relative differences in charge at each corner, the coordinates of the touch event.

In near-field imaging, a conducting layer of special internal structure has an applied constant voltage, which generates an electric field near the panel surface. A finger or stylus approaching the panel surface introduces distortion into this field, measuring the relative differences of the distortion with circuits placed at the panel corners allows a controller to determine the position of the contact.

In surface acoustic wave digitizers, a source of ultrasound (piezoelectric cell) generates a stationary acoustic (ultrasonic) field in a glass panel. A finger or stylus touching the surface absorbs ultrasound and, hence, modifies this field. The change is detected by ultrasonic sensors (piezoelectric sensor) whose positions determine the touch site.

Infrared digitizers employ pairs of linear arrays of point IR radiation sources and sensors arranged opposite to each other along the boundaries of the screen, close to its surface. Each array of sources illuminates the opposite array of sensors, one pair being situated on the horizontal boundaries and the other, on the vertical boundaries. Any object introduced into the near-surface region shadows the corresponding zone in the array of sensors, thus locating the touch site.

Of the above-described digitizer technologies, resistive, capacitive and near-field digitizers lend themselves most readily to being used with the present invention.

Magnetic Bead Tactile-Feedback Unit

Figure 2:
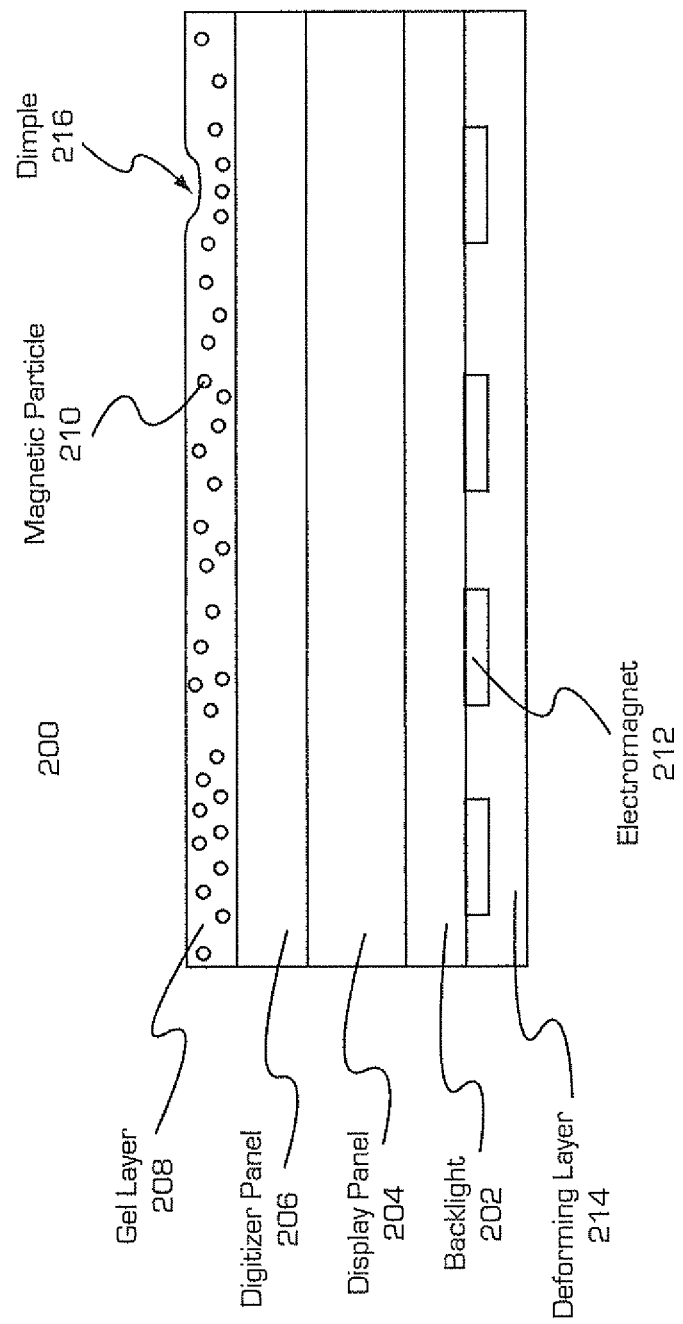
FIG. 2 illustrates a cross-sectional representation of a touch-screen display having tactile feedback in accordance with an embodiment of the present invention.

Referring to FIG. 2, a generalized cross-sectional view is provided of an embodiment of a tactile-feedback touch-screen 200. The tactile-feedback touch-screen 200 includes the conventional subassemblies, such as a backlight 202, display panel 204, and digitizer panel 206.

Additionally, a gel layer 208, containing a plurality of transparent magnetically attractive particles 210 is positioned over the digitizer panel. One such appropriate material is the iron-oxide glass beads disclosed in "Magnets-Value of the First Step" written by Ronald F. Ziolo, Ph.D. and published in *R&D Innovator* Vol. 3, No. 11, November 1994. An array of electromagnets 212 form a deforming layer 214 that is positioned behind the display panel 204 and backlight 202. The gel layer 208 and deforming layer 214 constitute a tactile-feedback unit 216. When one or more electromagnets 212 are energized, a portion of the gel layer 208 above the energized electromagnet deforms to form a dimple 216.

The number of electromagnets 212 is dependent on application requirements of the tactile-feedback touch screen. Typically, there would be a very small number of tactile zones on the screen (vs. the LCD resolution). For example, a 320×240 QVGA screen might only require twelve electromagnets positioned around the edges (four on a side) as it is unlikely that a small screen would contain more than this number of interface elements. Alternatively, in applications where the touch screen is large and interface elements vary in size and position, significantly more electromagnets 212 can be used.

Applying a pulse-width modulated drive signal to the corresponding electromagnet 212 will modulate the concavity of the dimple 216 formed over the electromagnet 212. In this manner, variable tactile profiles can be implemented. For example, if an interface element is associated with an operation that takes some time, the panel can communicate this back to the user by modulating the concavity of the dimple 216, once touched, until the operation is complete. The same sort of mechanism can be used to provide silent feedback that a requested operation has been completed, such as in the case of issuing a silent panic signal.

Hydrogel Tactile-Feedback Unit

Figure 3:
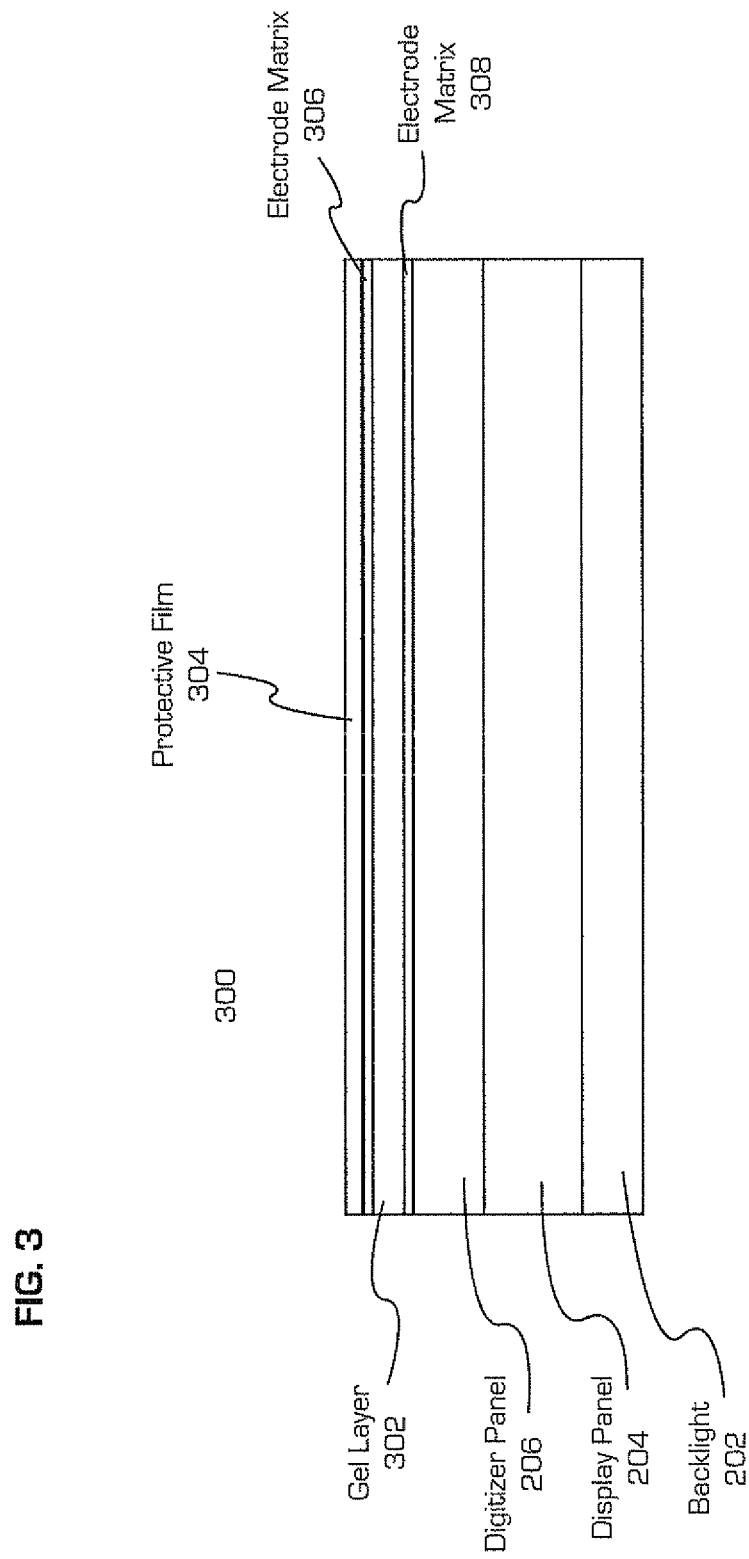
FIG. 3 illustrates a cross-sectional representation of a touch-screen display having tactile feedback in accordance with another embodiment of the present invention.

In an alternative embodiment shown in FIG. 3, instead of the deforming layer 214 and the gel layer 208 of the magnetic bead embodiment, a gel layer 302 having a transparent honeycomb structure is disposed immediately behind a front protective film 304 forming the outer most surface layer of the screen.

A first matrix of electrodes 306 (i.e., front electrode layer) is formed on a front surface of the gel layer 302 and a second matrix of electrodes 308 (i.e., rear electrode layer) is formed on a back surface of the gel layer 302. One set of electrodes oriented in the horizontal direction and the other set of electrodes oriented orthogonally in the vertical direction.

Both sets of electrodes are printed, sputtered or photolithographically etched on a transparent substrate. Sputter or vapor deposition are the standard processes at this time however any appropriate method can be utilized. The front electrode layer 306 is deposited on a flexible plastic/rubber layer. The rear electrodes are deposited on a more rigid material forming the rear electrode layer 308. In this configuration, the present embodiment maximizes the outward deflection of the surface, for a given drive signal.

Figure 4:
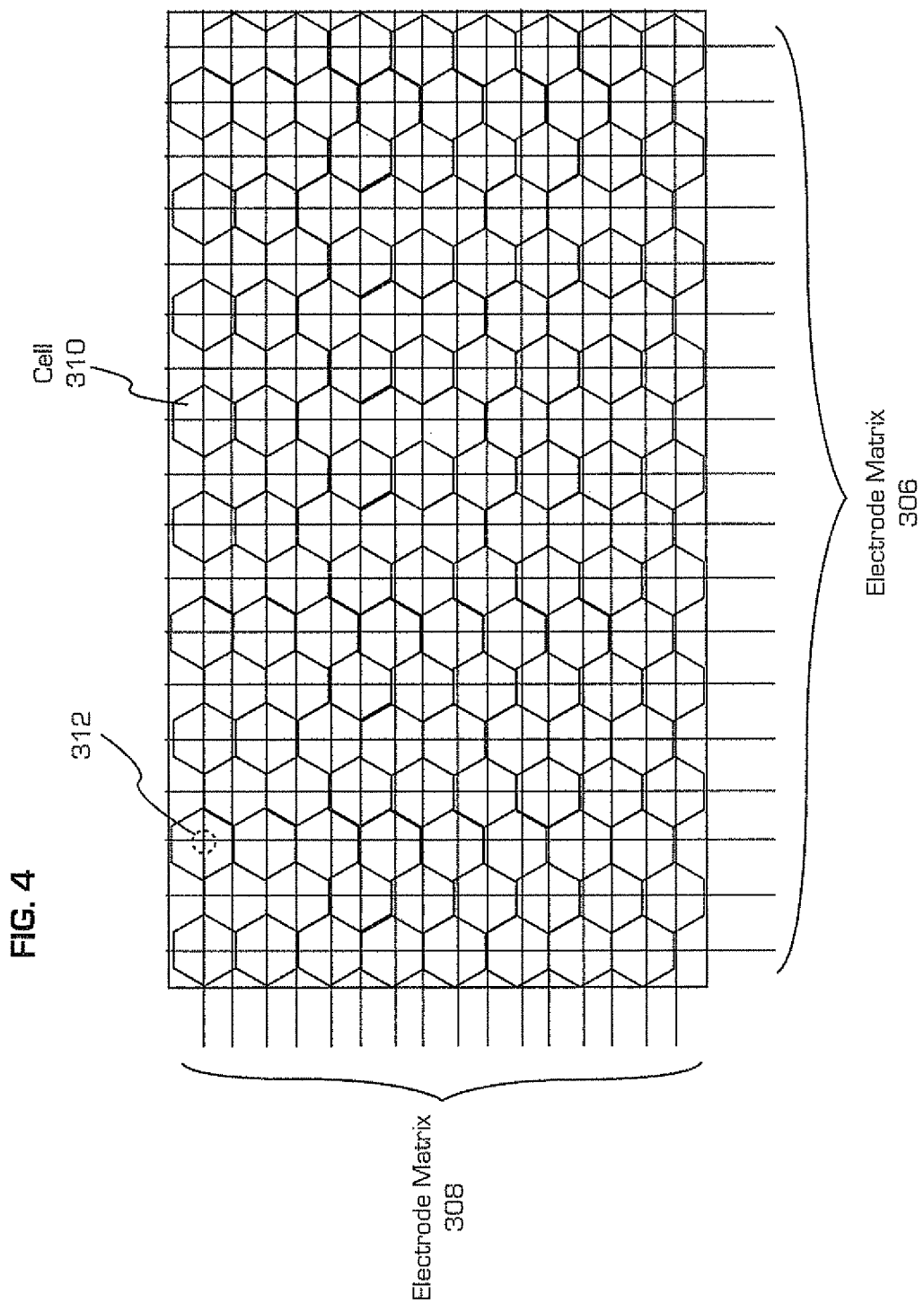
FIG. 4 illustrates a planar view of the embodiment of the present invention shown in FIG. 3.

An acceptable material for fabricating the electrodes is (w/w) 90% $In_2O_3$ with 10% $SnO_2$, commonly known as ITO. However, materials such as poly(3,4-ethylenedioxythiphene), commonly called PEDOT, or related compounds such as PEDOT:PSS or PEDOT-TMA ("Oligotron") are preferable. FIG. 4 is a top-down view of the gel layer 302 providing a better view of the construction of the gel layer.

As shown in FIG. 4, the first matrix of electrodes 306 and second matrix of electrodes 308 intersect at points 312 within the perimeter of each cell 310. The resulting electrode grid is driven with an X-Y drive circuit.

Each cell 310 is filled with a hydrogel. Polymer hydrogels exhibit large, reversible volume changes in response to various external stimuli, such as temperature, pH, solvent, and electric field. Consequently, when a drive current is applied across any given cell 310, the cell 310 bulges or contracts based on the polarity of the applied current, thus deforming the outer layer of the screen 304. As with the magnetic bead embodiment, the drive current in the hydrogel tactile feedback unit can be pulse-width modulated so as to provide modulation of the interface element.

The benefit of the hydrogel embodiment over the magnetic bead embodiment is in the ability to bulge the cell outward, as well as contract, or dimple, the cell. Moreover, the hydrogel embodiment allows for much finer resolution of the tactile feedback limited only by the size of the individual cells.

Additionally, because the hydrogel tactile feedback unit does not require a separate deforming layer as necessary in the magnetic bead embodiment, the overall thickness of the tactile-feedback touch-screen device can be minimized.

Driving the tactile surface is performed by bringing an electrode of the front electrode layer 306 (i.e., row electrode) to 0V relative to circuit ground. The remaining electrodes of the front electrode layer 306 are floating (i.e., held at high impedance). Individual electrodes of the rear electrode layer 308 (i.e., column electrodes) are set to a positive voltage (+V) greater than 0V if the corresponding cell is intended to be tactile (raised), or set to 0V in cells that are desired to be flat.

In cases where the hydrogel exhibits contraction properties in the presence of an electric field as well, a column electrode can be set to a negative voltage (−V) in order to dimple the corresponding cell. The dimpling effect in the present embodiment is somewhat limited by the rigidity of the rear electrode layer 308 material as well as the rigidity of the underlying structures.

Figure 5:
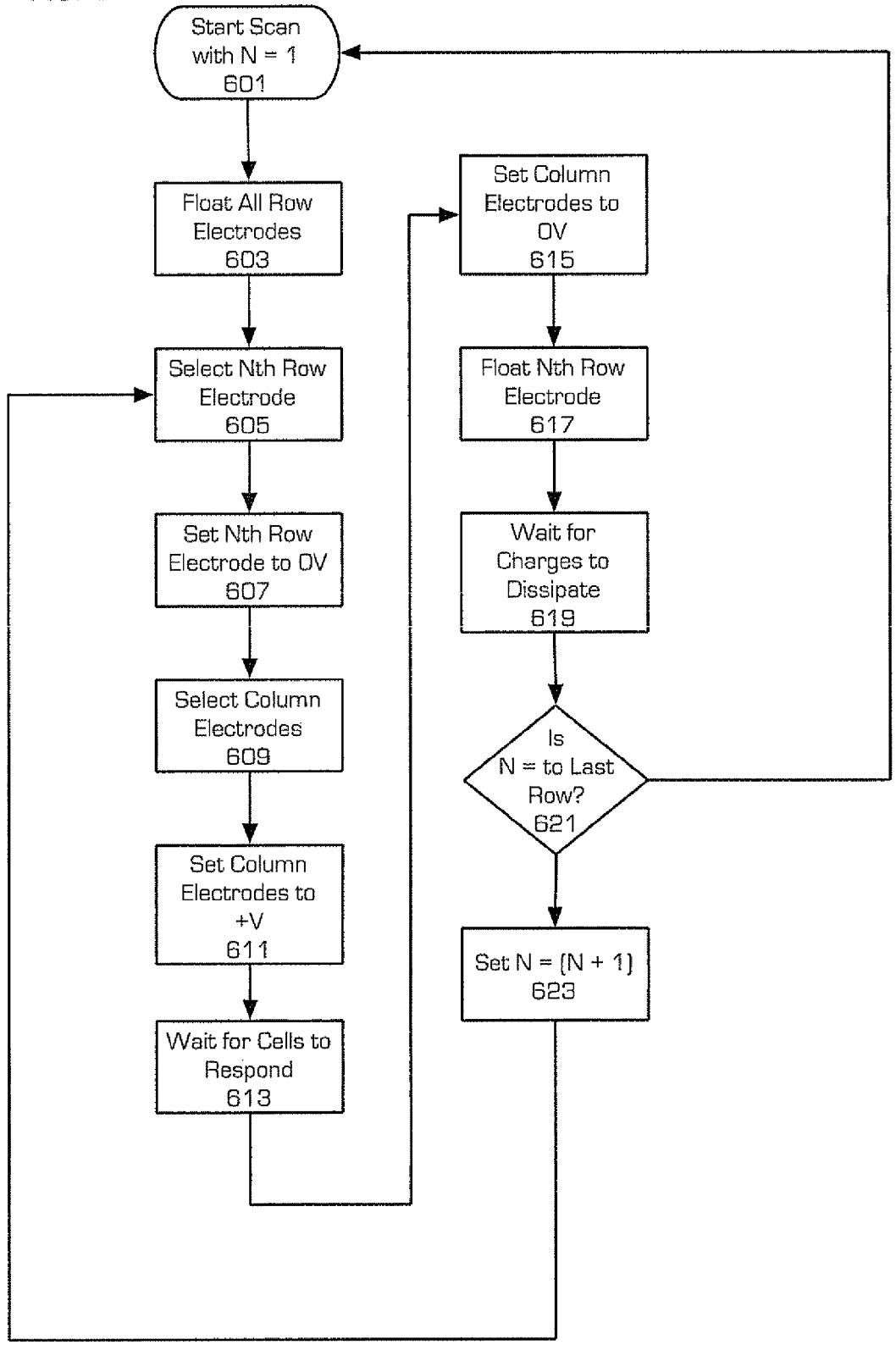
FIG. 5 illustrates a flow diagram representing a series of steps for driving a scanning mode of an embodiment of the present invention as shown in FIG. 3.

As shown in FIG. 5, the present embodiment can provide a scanning tactile sensation. To perform a scanning process across the surface of the tactile layer, the scanning begins by initializing the row electrode counter N to 1 in step 601. The row electrodes are floated to have high impedance in step 603. In step 605 the Nth row electrode is selected and set to a 0V value in step 607.

Proceeding to step 609, all column electrodes corresponding to cells that are to be activated are selected. In the case for providing a scanning sensation, all the column electrodes would be selected in step 609. The selected column electrodes are then set to +V, which is a positive voltage greater than 0V in step 611. As discussed above negative voltage vales can be used as well in embodiments where the hydrogel supports contraction.

This voltage configuration is maintained for a period of time sufficient to allow the cells to respond mechanically in step 613. Once the cells have responded to the induced electric field, the column electrodes are returned to 0V in step 615. The Nth row electrode is set to high impedance state in step 617. A second delay is provided in step 619 to allow the stored charge on the column electrodes to dissipate.

In step 621 the row electrode counter N is checked to determine if the last row electrode had just been selected. If the last row electrode had just been selected, the process returns to step 601 where the process begins anew. Otherwise, the process continues to step 623 where the row electrode counter N is incremented by 1. From this point the process returns to step 605 and continues as described previously.

If desired, the height of an individual cell can be varied multiple steps using the technique of Frame Rate Modulation (FRM), which is essentially a special case of pulse-width modulation. A description of LCD grayscaling using FRM is given in U.S. Pat. No. 6,064,359. The technique would be similar for this application, except for not being used to directly drive a display. FRM is valid for any application of this programmable tactile surface.

Figure 6:
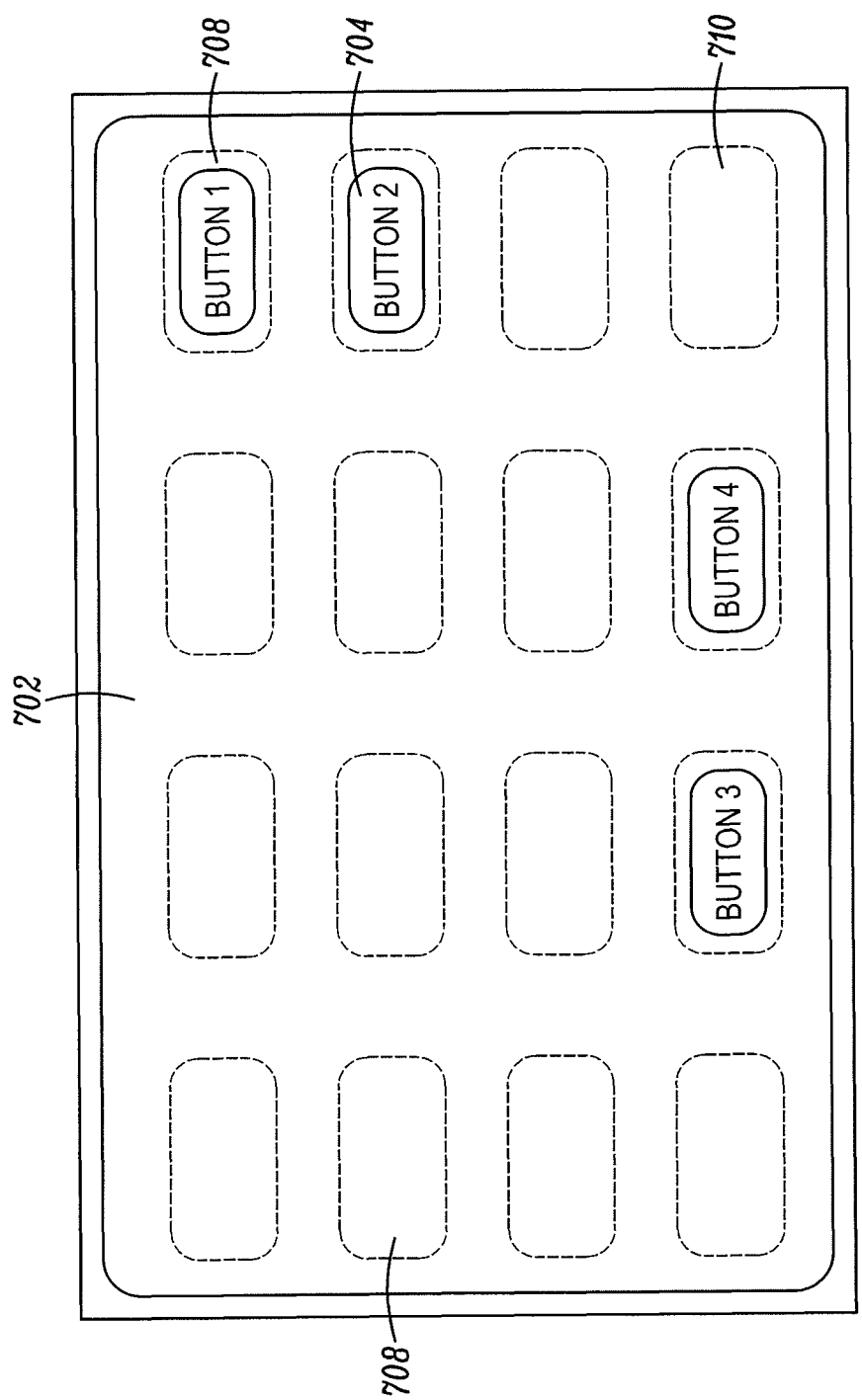
FIG. 6 illustrates a representation of a typical application of an embodiment of the present invention.

FIG. 6 illustrates a representation of an embodiment of the present invention in a typical application. As shown, a tactile feedback touch screen 702 displays a software-implemented graphical user interface having a plurality of defined control elements 704. These control elements are positioned by the software to overlap regions of active tactile feedback elements 708. In the shown application, 16 tactile feedback elements are evenly distributed on the display area of the tactile feedback touch screen 702. However, more or less tactile feedback elements can be provided.

Of the provided tactile feedback elements, some are active tactile feedback element 708 while others are inactive tactile feedback elements 710. A tactile feedback element can be switched between active and inactive as needed by the graphical user interface. Thus, when a control element 704 overlaps a tactile feedback element 708, the tactile feedback element is activated. On the other hand, when no control element overlaps a tactile feedback element as in the case of tactile feedback element 710, the system switches the tactile feedback element 710 to inactive.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. A rigid touch-screen display, comprising:
   a gel layer having a plurality of separately deformable discreet surface areas of said touch-screen display;
   a display layer that generates a display, the generated display including a plurality of control elements defined on said touch-screen display, each of the plurality of control elements positioned to overlap a corresponding discrete surface area of the plurality of separately deformable discrete surface areas;
   a digitizer layer that detects contact with and selection of one of the plurality of control elements on the touch-screen display surface by a user; and
   a tactile feedback controller that separately controls said deformation of each of said plurality of discrete surface areas of said gel layer, said tactile feedback controller activating the deformable discrete surface area corresponding to the selected control element at least in response to the detected contact and selection of the one of the plurality of control elements where activating includes producing a dimple or bulge in a relative thickness of the gel layer, the dimple or bulge is located on the discrete surface area directly over the selected control element.

2. The touch-screen display as in claim 1, further comprising a deforming layer disposed beneath said display layer, said deforming layer comprising a plurality of electromagnets arranged in a grid, each of said plurality of electromagnets being controllable by said tactile feedback controller.

3. The touch-screen display as in claim 2, wherein said gel layer is imbued with magnetically attractive particles.

4. The touch-screen display as in claim 2, wherein said magnetically attractive particles are formed of transparent glass beads containing iron oxide.

5. The touch-screen display as in claim 1, wherein said display layer is a liquid crystal display (LCD) panel.

6. The touch-screen display as in claim 1, wherein said display layer is a light emitting diode (LED) display panel.

7. The touch-screen display as in claim 1, wherein said digitizer layer is a resistive digitizer.

8. The touch-screen display of claim 1, wherein said digitizer layer is a capacitive digitizer.

9. The touch-screen display of claim 1, wherein said digitizer layer is a nearfield digitizer.

10. A tactile feedback unit for providing tactile feedback on a touch-screen display, said tactile feedback unit comprising:
    a gel layer having a plurality of separately deformable discrete surface areas of said touch-screen display, said gel layer being permeated with magnetically attractive particles;

at least one control element defined on said touch-screen display, the at least one control element overlapping one of the plurality of separately deformable discrete surface areas, the control element being selected by a user touching the at least one defined control element;

a tactile feedback controller that separately controls said deformation of each of said plurality of discrete areas of said gel layer including at least the active separately deformable discrete surface area; and a deforming layer having a plurality of electromagnets arranged in a grid, each of said plurality of electromagnets being controllable by said tactile feedback controller, where one of the plurality of electromagnets corresponds to each of the separately deformable discrete surface areas and wherein selection of the at least one control elements causes the tactile feedback controller to activate the corresponding one of the plurality of magnets thereby causing a dimple in a relative thickness of the gel layer, the dimple is located on the discrete surface area directly over the at least one defined control element.

11. The tactile feedback unit as in claim 10, wherein said magnetically attractive particles are formed of transparent glass beads containing iron oxide.

12. The tactile feedback unit as in claim 10, wherein said display layer is a liquid crystal display (LCD) panel.

13. The tactile feedback unit as in claim 10, wherein said display layer is a light emitting diode (LED) display panel.

14. The tactile feedback unit as in claim 10, wherein said digitizer layer is a resistive digitizer.

15. The tactile feedback unit as in claim 10, wherein said digitizer layer is a capacitive digitizer.

16. The tactile feedback unit as in claim 10, wherein said digitizer layer is a near-field digitizer.

17. A touch-screen display comprising:

a digitizer layer for detecting a location of contact with a touch-screen display surface by a user;

a gel layer having a plurality of separately deformable discreet surface areas of said touch-screen display;

a display layer that generates a display, the generated display including a plurality of control elements defined on said touch-screen display, each of the plurality of control elements positioned to overlap a corresponding discrete surface area of the plurality of separately deformable discrete surface areas;

a deforming layer disposed beneath said display layer, said deforming layer comprising a plurality of electromagnets arranged in a grid, each of the plurality of electromagnets corresponds to one of the plurality of separately deformable discrete areas; and a tactile feedback controller that separately controls each of said plurality of electromagnets of said plurality of electromagnets and the deformation of the corresponding discrete area, the tactile feedback controller detects selection of one of the plurality of control elements via the digitizer layer and in response activates the electromagnet corresponding to the selected control element, the activation of the electromagnet forms a dimple in a relative thickness of the gel layer, the dimple is located on the touch screen display directly over the selected control element.

* * * * *